(12) United States Patent
Yoshida et al.

(10) Patent No.: US 6,948,753 B2
(45) Date of Patent: Sep. 27, 2005

(54) DIVIDED STRUCTURE OF A LONG PLASTIC COMPONENT FOR A VEHICLE

(75) Inventors: Itsuo Yoshida, Saitama (JP); Takaaki Nagadome, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/289,285

(22) Filed: Nov. 7, 2002

(65) Prior Publication Data

US 2003/0094835 A1 May 22, 2003

(30) Foreign Application Priority Data

Nov. 16, 2001 (JP) ........................................ 2001-351039

(51) Int. Cl.⁷ .............................................. B60R 13/02
(52) U.S. Cl. ..................................... 296/1.08; 296/209
(58) Field of Search ............................... 296/1.08, 209, 296/39.1; 293/120, 126, 128; 52/716.5, 716, 716.7; 280/848

(56) References Cited

U.S. PATENT DOCUMENTS

| | | | | |
|---|---|---|---|---|
| 2,196,417 A | * | 4/1940 | Kelsen | |
| 3,359,030 A | * | 12/1967 | Newman | 293/128 |
| 3,388,523 A | * | 6/1968 | Evans | 52/16.5 |
| 3,506,294 A | * | 4/1970 | Newman | 293/128 |
| 3,752,521 A | * | 8/1973 | Lafebre | |
| 4,066,285 A | * | 1/1978 | Hall et al. | |
| 4,220,365 A | * | 9/1980 | Foster et al. | 293/128 |
| 4,229,036 A | * | 10/1980 | Toda | 296/202 |
| 4,268,078 A | * | 5/1981 | Nomura et al. | 293/120 |
| 4,268,079 A | * | 5/1981 | Nomura et al. | 293/120 |
| 4,325,574 A | * | 4/1982 | Umemoto et al. | 293/120 |
| 5,353,571 A | * | 10/1994 | Berdan et al. | |
| 5,697,644 A | * | 12/1997 | Logan et al. | |
| 5,957,512 A | * | 9/1999 | Inada et al. | 293/120 |
| 6,102,473 A | * | 8/2000 | Steininger | |
| 6,276,109 B1 | * | 8/2001 | Hingorani et al. | |
| 6,322,115 B1 | * | 11/2001 | Devilliers | 293/120 |
| 6,769,727 B2 | * | 8/2004 | Delavalle et al. | 296/29 |

FOREIGN PATENT DOCUMENTS

| | | |
|---|---|---|
| JP | 05-092742 | 4/1993 |
| JP | 09-104298 | 4/1997 |
| JP | 2001-071947 | 3/2001 |

* cited by examiner

Primary Examiner—Dennis H. Pedder
(74) Attorney, Agent, or Firm—Arent Fox, PLLC (57) ABSTRACT

An improved divided structure of a long plastic component for a vehicle is provided to facilitate an adjustment of a clearance in a joint between constituent parts thereof, thereby setting the clearance at an adequately small dimension. A plurality of constituent parts making up the long plastic component such as a side sill garnish are combined together into one long piece and mounted on a vehicle body. A first garnish is mounted on the vehicle body, and a second garnish is mounted on the first garnish in such a manner as to overlap with the first garnish from a direction substantially perpendicular to a longitudinal direction of the side sill garnish. Accordingly, the first garnish and the second garnish, which have been joined together, can be mounted on the vehicle body.

6 Claims, 7 Drawing Sheets

DIVIDED STRUCTURE OF A LONG PLASTIC COMPONENT FOR A VEHICLE

BACKGROUND OF THE INVENTION

This invention relates to a divided structure of a long plastic component for a vehicle, in which constituent parts making up the long plastic component are combined together into one long piece and mounted on a vehicle body.

Figure 12A:
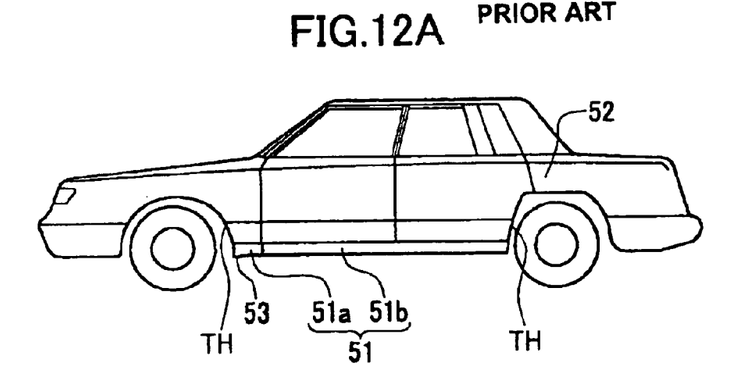
FIG. 12 is a schematic diagram of a conventional divided structure of the side sill garnish.

Among plastic components for a vehicle are a side sill garnish, a bumper, an air spoiler, and the like, which are long components mounted on the vehicle body. For example, as shown in FIG. 12A, a side sill garnish 51 is a component mounted on a lower edge of a side of a vehicle body 52 between tire housings TH of front and rear wheels. The side sill garnish 51 is mounted in such a manner as to slightly project outward widthwise from the side of the vehicle body 52. The side sill garnish 51 thus serves to determine the overall vehicle width and to protect the side of the vehicle body 52 against contact with foreign objects.

Figure 12B:
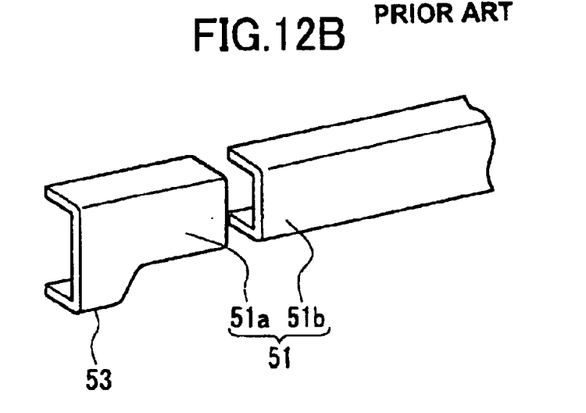

The side sill garnish 51 provided also contributes to enhanced flexibility in designing a decorative scheme of the vehicle and to improved aerodynamic characteristics. In many instances, thus, the side sill garnish 51 is not necessarily shaped into a simple straight line, but is rather modified continuously or locally into a curved and/or protruded shape. For example, a downward protrusion 53 may be provided at a front bottom edge of the vehicle as shown in FIG. 12A. In an assembly line of the vehicle, however, a hanger supporting a bottom edge of the side of the vehicle body 52 would for example interfere with the protrusion 53, thus, restrictions could sometimes be placed on the design flexibility with consideration given to plants and equipment. Therefore, in order to lift such restrictions, there is provided the side sill garnish 51 that is divided into constituent parts, for example as shown in FIG. 12B. Among the constituent parts, a garnish 51a including the protrusion 53 is mounted on the vehicle body 52 at a later stage of the assembly line.

According to a conventional divided structure of the side sill garnish 51, each garnish 51a, 51b is independently mounted on the vehicle body 52. However, this structure entails difficulties in relative position adjustment between the garnishes 51a and 51b due to possible errors in positioning the garnishes 51a and 51b on the vehicle body 52. Accordingly, this structure would disadvantageously create several problems. For example, both garnishes 51a and 51b could be mounted in a position vertically misaligned from each other, or difficulties could be entailed in adjusting a clearance in a joint between both garnishes 51a and 51b (where the garnishes are butt-joined in a longitudinal direction).

Moreover, the side sill garnish 51 is a plastic component, which thus expands and contracts more greatly in the longitudinal direction than any other direction under the influence of heat derived from high atmospheric temperature. Therefore, the clearance in the butt-joined portion between both garnishes 51a and 51b should be set on the basis of the clearance assumedly formed between the garnishes 51a and 51b that have expanded most greatly in the highest temperature conceivable. Since both garnishes 51a and 51b are independently mounted on the vehicle body 52, the garnishes 51a and 51b expand and contract with respect to respective mounted spots on the vehicle body 52. Accordingly, in the conventional structure, the clearance in the butt-joined portion between two garnishes 51a and 51b should disadvantageously have been set at an extremely large value, e.g., on the order of millimeters, with consideration given to the amount of expansion and contraction of the two garnishes 51a and 51b. The larger the clearance, the more liable is the outward appearance to be marred, the aerodynamic characteristics to be affected badly, and the more likely it is to be clogged.

The present invention has been created in order to eliminate the above disadvantages.

SUMMARY OF THE INVENTION

It is an exemplified general object of the present invention to provide a divided structure of a long plastic component for a vehicle, in which some of the above disadvantages are eliminated. Another exemplified and more specific object of the present invention is to provide a divided structure of a long plastic component such as a side sill garnish that facilitates an adjustment of a clearance in a joint between constituent parts thereof and thus serves to set the clearance at an adequately small dimension.

According to one exemplified aspect of the present invention, there is provided a divided structure of a long plastic component for a vehicle, in which a plurality of constituent parts making up the long plastic component are combined together into one long piece and mounted on a vehicle body. The constituent parts include a first constituent part to be mounted on the vehicle body, and a second constituent part to be mounted on the first constituent part in such a manner as to overlap with the first constituent part from a direction substantially perpendicular to a longitudinal direction of the long plastic component. The first constituent part and the second constituent part, which have been joined together, are mounted on the vehicle body.

In this structure, the relative position of the first and second constituent parts is determined solely by a relationship between both constituent parts regardless of positions thereof relative to the vehicle body. Accordingly, an adjustment may be made with ease in the clearance in a butt-joined portion of both constituent parts. Moreover, the second constituent part moves according to the expansion and contraction of the first constituent part due to change in ambient temperature or the like. Therefore, the clearance may be determined with consideration given only to the amount of expansion or contraction of the second constituent part alone, and thus the clearance may be set to a very small value. Consequently, the outward appearance (as well as flexibility in designing the same) and the aerodynamic characteristics of the long plastic component are improved, and the possibility of clogging with dust or the like is reduced.

According to another exemplified aspect of the present invention, one of the above first and second constituent parts in the above divided structure includes a male engageable protrusion protruding toward the other, while the other includes a female engageable portion into which the male engageable protrusion is fitted. In addition, one of the male engageable protrusion and the female engageable portion includes a longitudinal rib extending in the longitudinal direction. The first and second constituent parts are joined together by fitting the male engageable protrusion into the female engageable portion with the constituent parts each guided in an adequate relative position in the longitudinal direction by the longitudinal rib.

In this structure, an adjustment can easily be made in a longitudinal clearance in the butt-joined portion between both constituent parts by setting the dimensions of the longitudinal rib as appropriate. The longitudinal rib is a locally provided small piece, and thus fine adjustments in the dimensions thereof and alteration in the shape thereof are very easy. Consequently, adjustability of the clearance in the butt-joined portion between both constituent parts can be improved.

According to yet another exemplified aspect of the present invention, one of the above first and second constituent parts in the above divided structure includes a male engageable protrusion protruding toward the other, while the other includes a female engageable portion into which the male engageable protrusion is fitted. In addition, one of the male engageable protrusion and the female engageable portion includes a vertical rib extending in a direction substantially perpendicular to the longitudinal direction of the first constituent part. The first and second constituent parts are joined together by fitting the male engageable protrusion into the female engageable portion with the constituent parts each guided in an adequate relative position in the direction substantially perpendicular to the longitudinal direction by the vertical rib.

In this structure, a relative position of both constituent parts in a direction perpendicular to the longitudinal direction can easily be adjusted by setting the dimensions of the vertical ribs as appropriate. Each vertical rib is a locally provided small piece, and thus fine adjustments in the dimensions thereof and alteration in the shape thereof are very easy. Consequently, adjustability of the relative position of both constituent parts can be improved in a direction substantially perpendicular to the longitudinal direction.

Preferably, the above first constituent part is mounted on the vehicle body with a first clip, and the above second constituent part is mounted on the first constituent part with a second clip. This structure can realize a simplified mounting operation that requires no tools, which would otherwise be needed, for example, to perform the mounting operation with a bolt, a nut, a tap bolt or the like. Consequently, the operating efficiency in a mounting process is improved. More preferably, one of the above first and second constituent parts includes a reinforcing rib for enhancing stiffness around a portion where the second clip is fastened, which reinforcing rib is located near the portion. This structure enhances stiffness of a mount portion where the second constituent part is mounted on the first constituent part, and serves to prevent the portion where the clip is fastened from being deformed due to a load imposed.

Moreover, the first constituent part includes a first flange extending in a direction substantially perpendicular to the longitudinal direction, and the second constituent part includes a second flange extending along the first flange. The first constituent part is fixed on the vehicle body along the longitudinal direction at the first flange. The second flange is superposed on the first flange, and the second constituent part is fixed on the first constituent part along the longitudinal direction at the superposed flanges.

This structure enhances stiffness of a mount portion where the long plastic component as a whole is mounted on the vehicle body. In particular, the flange formed on a longitudinal end portion serves to effectively prevent the loosening and rattling of the end portion of the long plastic component.

Other objects and further features of the present invention will become readily apparent from the following description of preferred embodiments with reference to accompanying drawings.

DETAILED DESCRIPTION OF THE PREFERRED EMBODIMENTS

A description will now be given of one exemplified embodiment of the present invention in which a long plastic component is a side sill garnish mounted on a bottom edge of a side of a vehicle body with reference to the drawings. In the drawings, one side sill garnish to be mounted on the left side of the vehicle body is illustrated, but the other side sill garnish to be mounted on the right side of the vehicle body is a mirror image of the right side sill garnish and thus a duplicate description of the same construction will be omitted.

Figure 1:
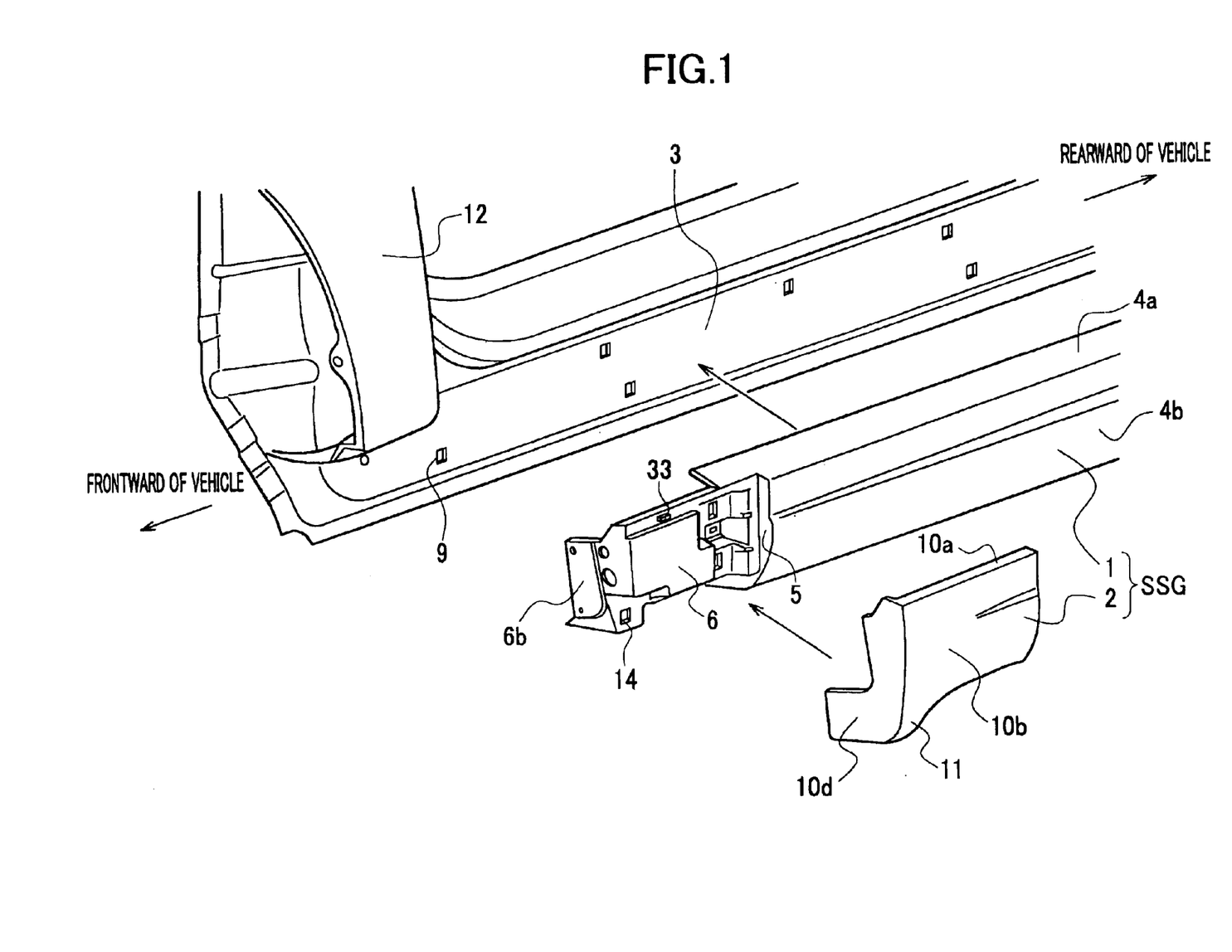
FIG. 1 is an exploded perspective view of a side sill garnish disassembled into constituent parts thereof and viewed from the outside of a vehicle body.
Figure 2:
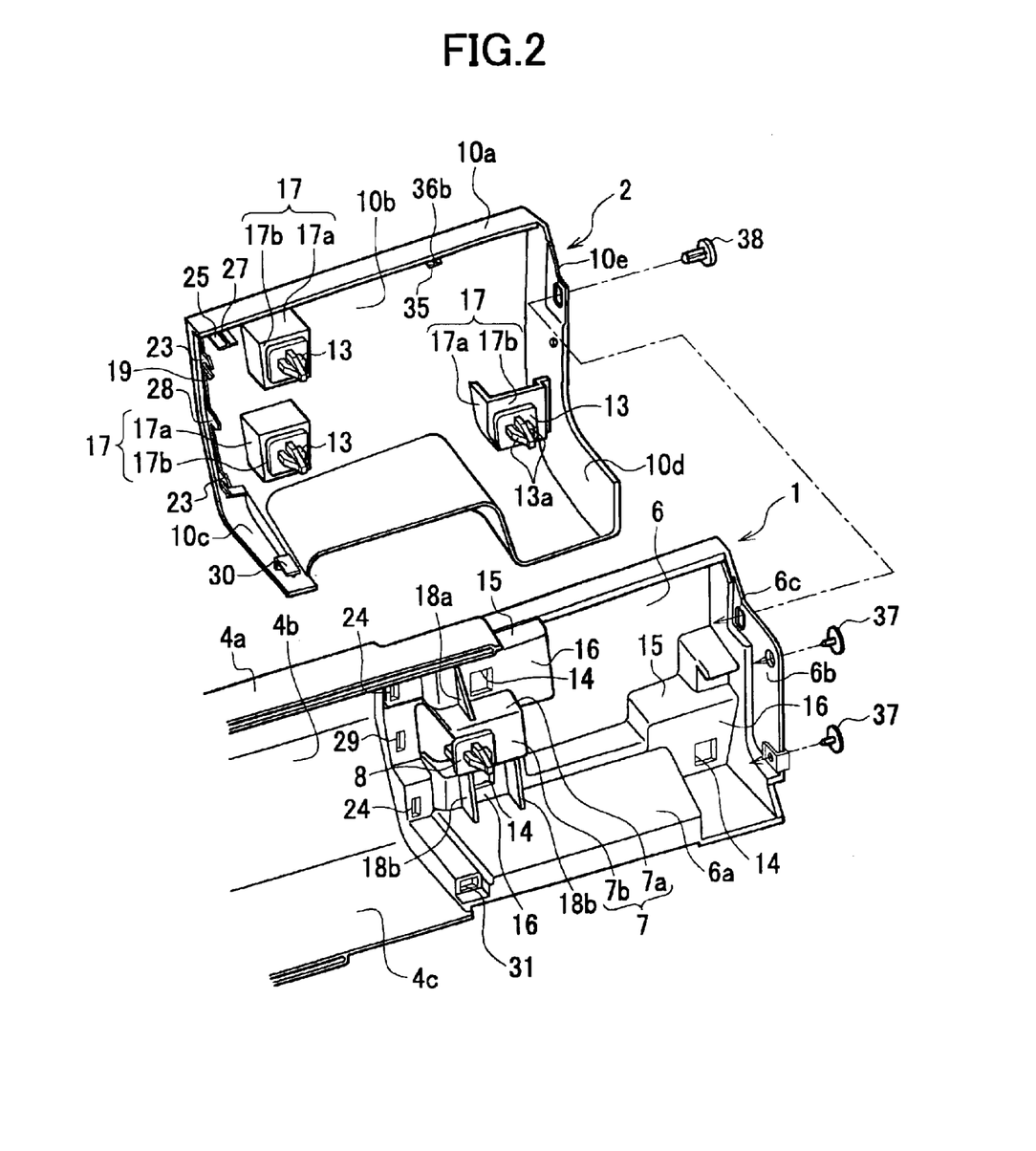
FIG. 2 is an exploded perspective view of the side sill garnish disassembled into the constituent parts and viewed from the inside of the vehicle body.
Figure 3:
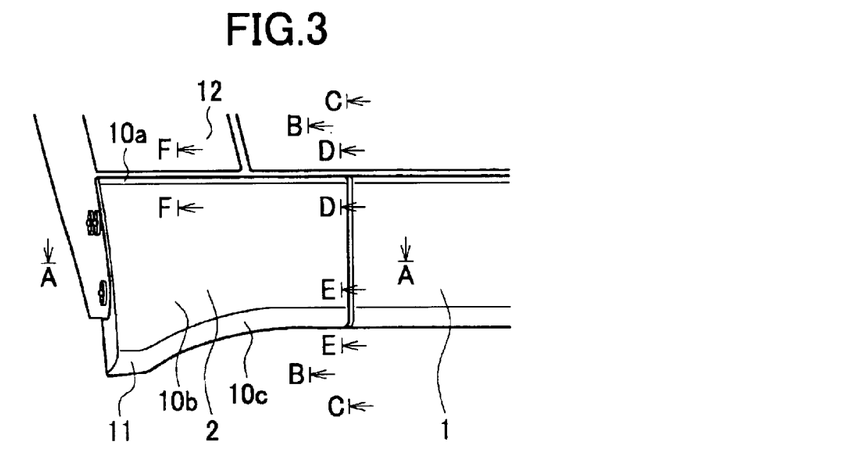
FIG. 3 is a schematic side elevation partially showing the side sill garnish mounted on the vehicle body.
Figure 4:
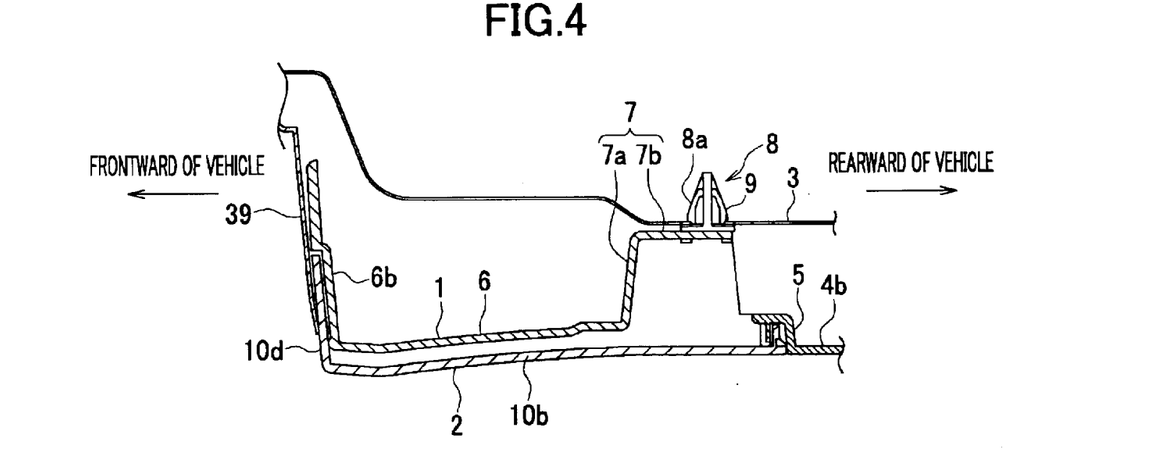
FIG. 4 is a cross section taken along line A—A of FIG. 3.
Figure 5:
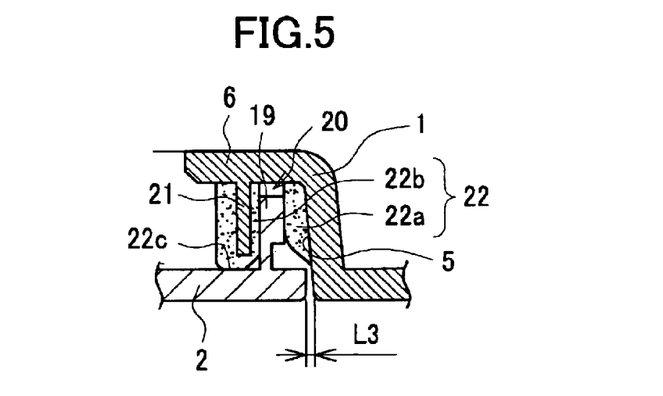
FIG. 5 is a schematic magnified diagram of part around a longitudinal rib 22 shown in FIG. 4.
Figure 6:
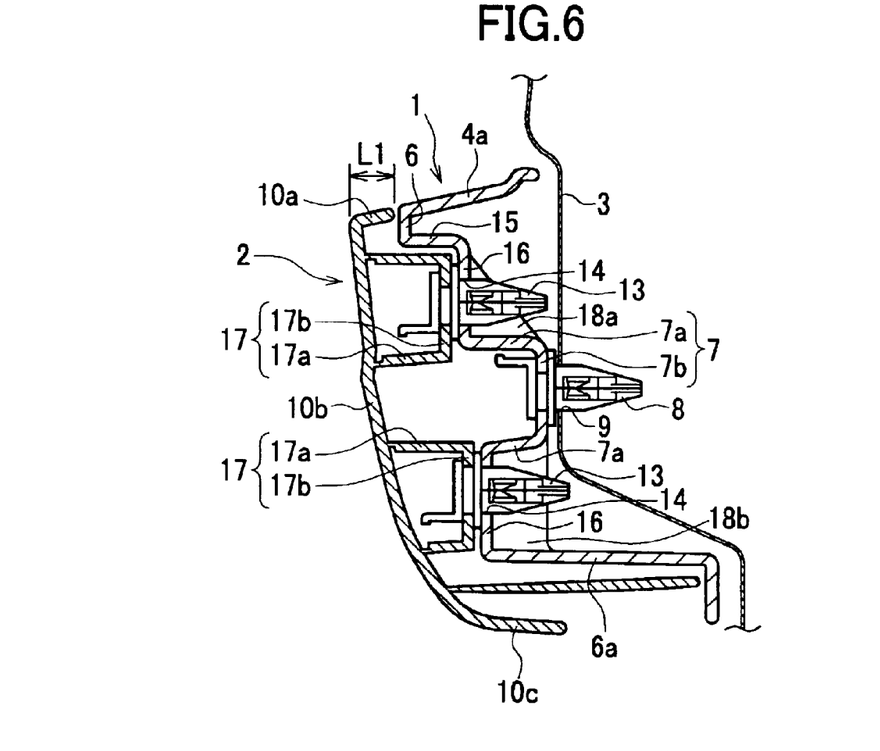
FIG. 6 is a cross section taken along line B—B of FIG. 3.

FIG. 1 is an exploded perspective view of the side sill garnish disassembled into constituent parts thereof and viewed from the outside of the vehicle body; FIG. 2 shows the same in perspective as viewed from the inside of the vehicle body (though the body itself is not illustrated herein). FIG. 3 is a schematic side elevation partially showing the side sill garnish mounted on the vehicle body. FIG. 4 is a cross section taken along line A—A of FIG. 3. FIG. 5 is a schematic magnified diagram of part around a longitudinal rib shown in FIG. 4. FIG. 6 is a cross section taken along line B—B of FIG. 3. In FIG. 1, a side sill garnish SSG is a component to be mounted on a bottom edge of a side of a vehicle body 3 between a front wheel and a rear wheel. The side sill garnish SSG is comprised of a plurality of constituent parts which include a first constituent part (hereinafter referred to as first garnish) 1 and a second constituent part (hereinafter referred to as second garnish) 2. Each constituent part is made for example of polypropylene or other synthetic resin.

Figure 7:
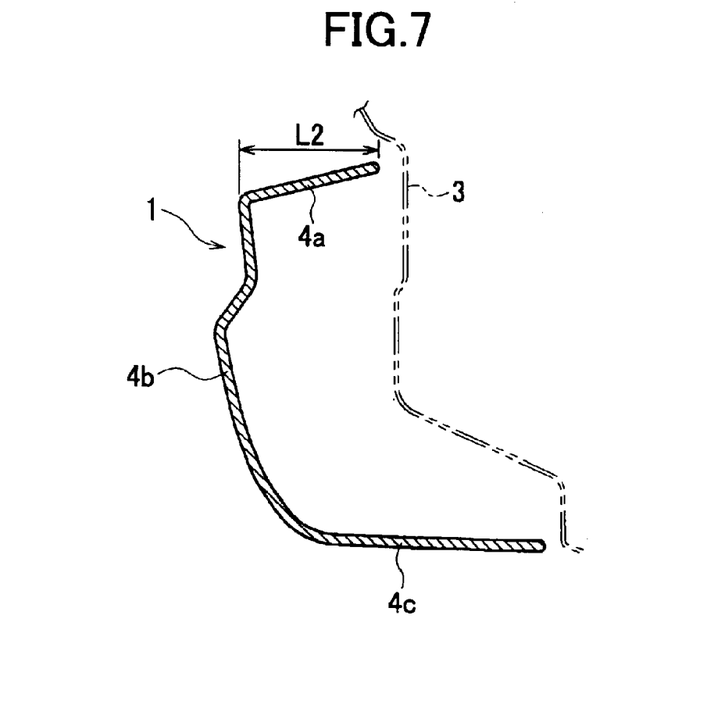
FIG. 7 is a schematic vertical section of a first garnish.

The first garnish 1 is a long component to be mounted on a bottom edge of the side of the vehicle body 3, and has substantially the same longitudinal dimension as the length of the bottom edge of the side of the vehicle 3 between tire housings of the front and rear wheels. FIG. 7 is a schematic vertical section of the first garnish 1. The first garnish 1 generally, as shown in FIG. 7, has a substantially U-shaped vertical section constituted of a top plate 4a, a side plate 4b, and a bottom plate 4c, except a part to which the second garnish 2 (as shown in FIG. 1) is attached. Clip mount brackets (not shown) that protrude toward the vehicle body 3 are formed continuously, or separately with each bracket spaced at intervals, in the longitudinal direction (perpendicular to the cross section shown in FIG. 7) on an inner surface of the side plate 4b, so that the first garnish 1 is fastened to the vehicle body 3 with clips attached to the clip mount brackets.

At a front end portion of the first garnish 1, as shown in FIGS. 1 and 4, is formed a mount plate 6 separated with a stair step riser portion 5 and extending substantially in the longitudinal direction at a widthwise position closer to the vehicle body 3 relative to the side plate 4b. The mount plate 6 constitutes amount on which the second garnish 2 is mounted. In the present embodiment, the mount plate 6 is, as shown in FIG. 4, not completely parallel with the side plate 4b, but gradually deflects in a widthwise-outward direction of the vehicle in accordance with distance toward the front of the vehicle. At a bottom end of the mount plate 6, as shown in FIGS. 2 and 6, is formed a bottom plate 6a extending in a substantially horizontal direction toward the vehicle body 3.

The mount plate 6 is provided, as shown in FIGS. 2, 4, and 6, with a clip mount bracket 7 that includes a riser wall 7a protruding toward the vehicle body 3, and a clip mount plate 7b extending from a distal end of the riser wall 7a in a direction at right angles thereto. With a first clip 8 attached to the clip mount bracket 7, the mount plate 6, that is, the front end portion of the first garnish 1, is mounted on the vehicle body 3.

The clip 8 may be embodied in a known clip structure that includes an elastically deformable stopper 8a made for example of synthetic resin or the like, as shown in FIG. 4. To be more specific, the stopper 8a is inserted, with its shape elastically deformed under stress caused by the insertion, into a first clip hole 9 provided in the vehicle body 3, and the shape of the stopper 8a is then restored upon completion of the insertion, so as to hold an edge around the periphery of the clip hole 9, so that the first garnish is fastened to the vehicle body 3. In the present embodiment, the clip 8 is provided separately from the first garnish 1, but may be integrally formed with the first garnish 1.

As shown in FIG. 1, the second garnish 2 is mounted to overlap with the front end portion of the first garnish 1 from a direction substantially perpendicular to the longitudinal direction of the first garnish 1 (in the present embodiment, from the direction perpendicular to the paper plane in FIG. 3; i.e., from a widthwise outward direction of the vehicle). In other words, the second garnish 2 is mounted to overlap with the first garnish 1 in such a manner as to cover part of the first garnish 1, more specifically, the mount plate 6 constituting the front end portion of the first garnish 1.

The second garnish 2 is, as shown in FIG. 6, substantially shaped like a U letter in cross section, which is comprised of a top plate 10a, a side plate 10b, and a bottom plate 10c. At a front end portion of the second garnish 2, as shown in FIG. 1, is formed a flange 10d extending along a plane substantially perpendicular to the longitudinal direction thereof from the side plate 10b toward the vehicle body 3. With the second garnish 2 mounted on the first garnish 1, the top plate 10a, side plate 10b, and bottom plate 10c of the second garnish 2 as shown in FIG. 6 are continuously joined and get flush with the top plate 4a, side plate 4b, and bottom plate 4c of the first garnish 1 as shown in FIG. 7, respectively.

As shown in FIG. 4, the side plate 10b is designed based on the outward appearance or the like to gradually deflect in a widthwise-outward direction of the vehicle in accordance with distance toward the front of the vehicle. However, the side plate 10b may be formed in parallel with the front-rear direction of the vehicle so as not to broaden the width of the vehicle toward the front. Moreover, as shown in FIG. 3, at a front-end portion of the bottom plate 10c of the second garnish 2 is formed a protrusion that protrudes downward so as to gradually sag in accordance with distance toward the front of the vehicle. This protrusion 11 is formed based on the outward appearance, aerodynamic characteristics and/or the like, and thus is not necessarily provided according to individual circumstances.

In the present embodiment, a dimension of the top plate 10a of the second garnish 2 as measured in a width direction of the vehicle (i.e., indicated by L1 in FIG. 6) is designed to be smaller than a dimension of the top surface 4a of the first garnish 1 in the width direction of the vehicle (i.e., indicated by L2 in FIG. 7). Thus, a large amount of clearance is given between the top plate 10a and the vehicle body 3. However, there is an overhang 12 that juts out in a widthwise-outward direction of the vehicle body 3 over the clearance as shown in FIG. 1, so that the overhang may cover the clearance.

A description will now be given in detail of a mounting structure of the second garnish 2 on the first garnish 1. Referring to FIG. 2, the mount plate 6 of the first garnish 1 is provided with a plurality of (e.g., three in the present embodiment) second clip holes 14 into which the second clips 13 are fitted to hold the mount plate 6. The mount plate 6 of the first garnish 1 is, as described above, designed to gradually deflect in a widthwise-outward direction of the vehicle in accordance with distance toward the front of the vehicle (see FIG. 4), and to form a gently curved plate that gently curves in a vertical direction of the vehicle. Accordingly, if the clip holes 14 were directly provided in the gently curved plate, the clips 13 could not securely hold the mount plate 6 without a risk of loosening and rattling.

Therefore, in the present embodiment, there are provided riser walls 15 protruding from the gently curved plate toward the vehicle body 3, and vertical plates 16 that are vertically oriented when the first garnish 1 is mounted on the vehicle body 3 are each formed at a distal end of each riser wall 15, so that a clip hole 14 is provided at a spot in each vertical plate 16. Providing the clip hole 14 in a flat plate allows the clip 13 to securely hold the mount plate 6, serving to prevent the loosening and rattling of the clip 13. It is to be understood that each vertical plate 16 is in a position parallel to the front-rear direction of the vehicle.

On the other hand, at each spot corresponding to the clip holes 14 of the first garnish 1 on an inner surface of the side plate 10b of the second garnish 2 is provided a clip mount bracket 17 that includes a riser wall 17a protruding toward the vehicle body 3 (toward the first garnish 1) and a clip mount plate 17b extending from a distal end of the riser wall 17a in a direction at right angles thereto. The second clip 13 is attached to the clip mount bracket 17.

In the present embodiment, the material and structure of the second clip 13 are the same as those of the first clip 8. Accordingly, the elastically deformable stopper 13a (as in FIG. 2) is inserted, with its shape elastically deformed under stress caused by the insertion, into the clip hole 14, and the shape of the stopper 13a is then restored upon completion of the insertion so as to hold an edge around the periphery of the clip hole 14, so that the second garnish 2 is fastened to the first garnish 1. In the present embodiment, the clip 13 is provided separately from the second garnish 2, but may be integrally formed with the second garnish 2.

As described above, the second garnish 2 (second constituent part) is mounted to overlap with the first garnish 1 (first constituent part) mounted on the vehicle body 3 from a direction substantially perpendicular to a longitudinal direction of the first garnish 1 (in the present embodiment, from a widthwise outward direction of the vehicle), so that the first garnish 1 and the second garnish 2, which have been joined together, are mounted on the vehicle body 3. Advantageous features of the above mounting structure will be described hereinafter. It should be noted that the conventional divided structure of the side sill garnish as described above, in which each constituent part is separately mounted on the vehicle body, has the disadvantages of difficult adjustment of a clearance in a joint (butt-joined portion) between the constituent parts, and of limitation placed on the minimum clearance by the expansion and contraction due to change in ambient temperature.

By contrast, according to the present invention, the second garnish 2 is mounted in a position relative to the first garnish 1; in other words, a position of the second garnish 2 relative to the first garnish 1 is determined solely by a relationship between both garnishes 1 and 2 regardless of positions thereof relative to the vehicle body 3. Accordingly, an adjustment may be made with ease in the clearance (e.g., as indicated by L3 in FIG. 5) in a butt-joined portion of both garnishes 1 and 2.

Since the second garnish 2 is mounted on the first garnish 1, the second garnish 2 moves according to the expansion and contraction of the first garnish 1 due to change in ambient temperature or the like. To be more specific, the clearance L3 may be determined with consideration given only to the amount of expansion or contraction of the second garnish 2 alone, and thus the clearance L3 may be set to a very small value, for example, to 0.5 mm or so. Consequently, the outward appearance, flexibility in designing the same, and the aerodynamic characteristics of the side sill garnish are improved, and the possibility of clogging with dust or the like is reduced.

Further, the mounting structure in which the first garnish 1 is mounted on the vehicle 3 with one or more of the clips 8 and the second garnish 2 is mounted on the first garnish 1 with one or more of the clips 13 can achieve a simple mounting operation that requires no tools which would otherwise be needed, for example to perform the mounting operation with a bolt, a nut, a tap bolt, or the like. Consequently, the operating efficiency in a mounting process is improved.

Although the clip 8 is attached to the first garnish 1 and the clip 13 is attached to the second garnish 2 in the above-described embodiment, another embodiment is also possible in which the clip 8 is attached to the vehicle body and/or the clip 13 is attached to the first garnish 1. Considering the operating efficiency in the mounting process, however, the present embodiment is preferable in which the clip 8 is attached to the first garnish 1 and the clip 13 is attached to the second garnish 2.

When the second garnish 2 is mounted on the first garnish 1, the weight of the second garnish 2 imposes a load on an edge around the periphery of the clip hole 14, which edge is held by the clip 13. Accordingly, the edge held by the clip 13 could possibly deform with time in the long term. For that reason, in the present embodiment, the first garnish 1 includes a reinforcing rib located near a portion around the edge held by the clip 13 to reinforce the portion around the edge.

Referring to FIG. 6, reinforcing ribs 18a and 18b are provided on the vertical plate 16. The reinforcing rib 18a is formed at a side of the upper clip hole 14 in such a manner as to extend vertically between the vertical plate 16 and the riser wall 7a of the clip mount bracket 7 so as to form a triangle as viewed from the longitudinal direction. Referring further to FIG. 2, the reinforcing rib 18b is formed at both sides of the lower clip hole 14 in such a manner as to extend vertically between the riser wall 7a of the clip mount bracket 7 and the bottom plate 6a.

The reinforcing ribs 18a and 18b consequently serve to reinforce the edge around the periphery of each clip hole 14. Particularly, the reinforcing ribs 18a and 18b are formed so as to extend vertically, and thus vertical stiffness is enhanced so that the load imposed vertically on the edge around the periphery of each clip hole 14 by the weight of the second garnish 2 may be supported effectively. The other clip hole 14 that is located near the flange 6b as shown in FIG. 2 is not particularly provided with a reinforcing rib because the flange 6b serves as reinforcements.

In the different embodiment as described above, though not illustrated, where the clip 13 is attached to the first garnish 1, the clip hole 14 is formed in the second garnish 2, and thus the reinforcing rib is provided on the second garnish 2.

Next, a description will be given of a rib serving to position the second garnish 2 relative to the first garnish. Only using the above-described clips 13 that could possibly loosen would cause the second garnish 2 to rattle slightly. Moreover, if the second garnish need be accurately positioned at the spot held by the clip 13, the structure of the stopper 13a should be more complicated, and/or the shape of the elastically deformable stopper 13a should be designed with great precision. The rib as will be described below is provided to facilitate an adjustment in the positioning of the second garnish 2.

Figure 8:
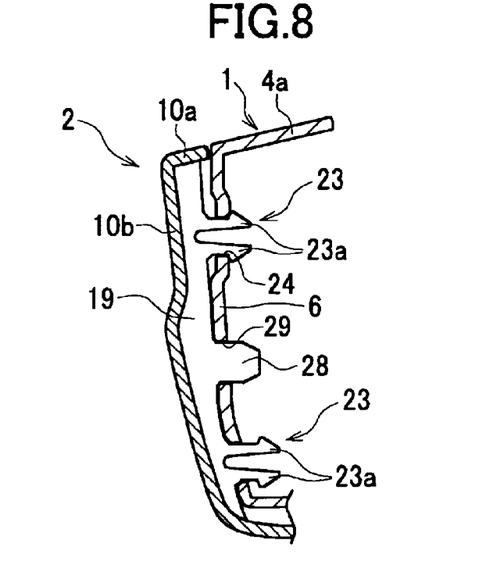
FIG. 8 is a cross section taken along line C—C of FIG. 3.
Figure 9:
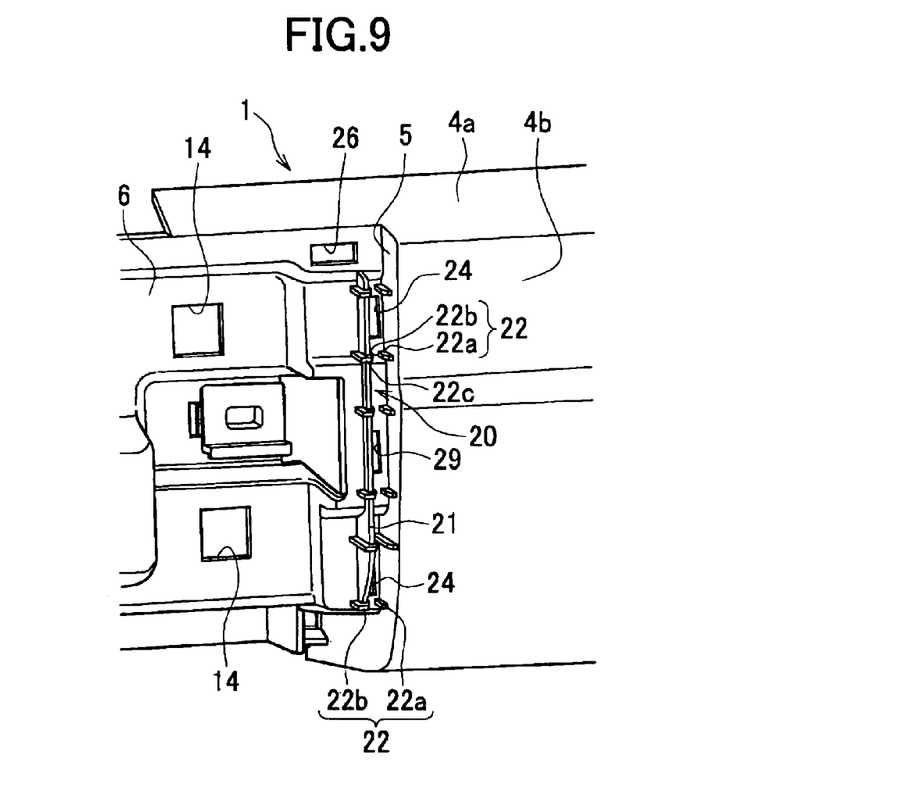
FIG. 9 is an external perspective view showing a structure of the longitudinal ribs 22 in the first garnish 1.

FIG. 8 is a cross section taken along line C—C of FIG. 3, and FIG. 9 is an external perspective view showing a structure of the longitudinal ribs 22 in the first garnish 1. On the second garnish 2 near the rear end thereof (to be butt-joined with the first garnish 1) is formed a male engageable protrusion 19 that protrudes toward the first garnish 1 (in the direction of the width of the vehicle in the present embodiment) and extends vertically at the inner surface of the side plate 10b as shown in FIGS. 2, 8, and other drawings. In the meantime, on the first garnish 1 is formed, as shown in FIG. 5, a female. engageable portion 20 into which the male engageable protrusion 19 is fitted. The female engageable portion 20 is shaped like a groove extending along a vertical direction in a manner that permits the male engageable protrusion 19 to be inserted into the groove. In the present embodiment, the groove of the female engageable portion 20 is made up of the stair step riser portion 5, and a partition wall 21 that protrudes from the mount plate 6 toward the second garnish 2 and extends vertically.

The female engageable portion 20 is provided with a longitudinal rib 22 that extends in the longitudinal direction (horizontal direction in FIG. 5). In the present embodiment, the longitudinal rib 22 is comprised of a longitudinal rib 22a provided at the stair step riser portion 5, and a longitudinal rib 22b provided at the partition wall 21. The clearance between the longitudinal ribs 22a and 22b in the longitudinal direction is set at a dimension as small as or slightly smaller than the width of the male engageable protrusion 19, so that the female engageable protrusion 19 is pressed and fitted into the clearance. A pair of the above ribs 22a and 22b constitutes the longitudinal rib 22, of which more than one is provided and arranged vertically with an interval placed between the longitudinal ribs 22 as shown in FIG. 9.

Accordingly, when the male engageable protrusion 19 is fitted in the female engageable portion 20, the male engageable protrusion 19 is restrained from moving in the longitudinal direction by the longitudinal ribs 22a and 22b, and thus the second garnish 2 is adequately positioned in the longitudinal direction relative to the first garnish 1. The longitudinal rib 22 thus provided between the male engageable protrusion 19 and the female engageable portion 20 may be provided at the male engageable protrusion 19, and the same effect can be achieved in this embodiment, too.

With this construction in which both garnishes are positioned relatively in the longitudinal direction using the longitudinal rib 22, an adjustment can easily be made in a longitudinal clearance (as indicated by L3 in FIG. 5, for example) in the butt-joined portion between both garnishes by setting the dimensions of the longitudinal rib 22 as appropriate. The longitudinal rib 22 is a locally provided small piece; thus, fine adjustments in the dimensions thereof and alteration in the shape thereof are very easy. Consequently, improved adjustability of the clearance in the butt-joined portion between both garnishes can be achieved.

As shown in FIGS. 2 and 8, a tip of each male engageable protrusion 19 has a pair of base lugs 23 at the top and bottom thereof. Each base lug 23 includes a pair of elastically deformable stopper hooks 23a, and is held at a base lug hole 24 provided in the mount plate 6 of the first garnish 1. The base lug 23 uses the stopper hooks 23a to restrain the second garnish 2 from moving toward a direction in which the second garnish 2 is detached from the first garnish 1, so that the first garnish 1 and the second garnish 2 are relatively positioned adequately in the direction of the width of the vehicle.

Next, a description will be given of a vertical rib that serves to relatively position the first garnish 1 and the second garnish 2 adequately in a direction perpendicular to the longitudinal direction. As shown in FIG. 5, one of the longitudinal ribs (the rib 22b) is provided with a vertical rib 22c that projects beyond the tip (lower end in FIG. 5) of the partition wall 21 toward the second garnish 2, i.e., in a direction perpendicular to the longitudinal direction in such a manner that the vertical rib 22c is contiguous with the longitudinal rib 22b and that projecting vertical rib 22c contacts the inner surface of the second garnish 2. Thus, the second garnish 2 is restrained from moving in a direction toward the first garnish 1, so that the second garnish 2 is adequately positioned in the direction of the width of the vehicle (a direction perpendicular to the longitudinal direction). With the rib provided to position in the direction of the width of the vehicle, adjustability of the relative mounting positions of both garnishes in the direction of the width of the vehicle can be improved.

Figure 10A:
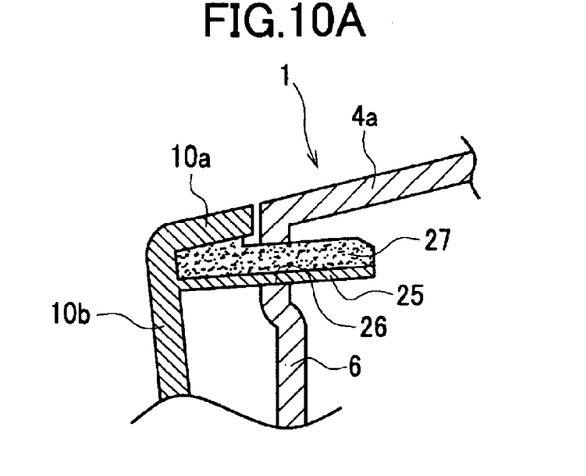
FIG. 10A is a cross section taken along line D—D of FIG. 3.
Figure 10B:
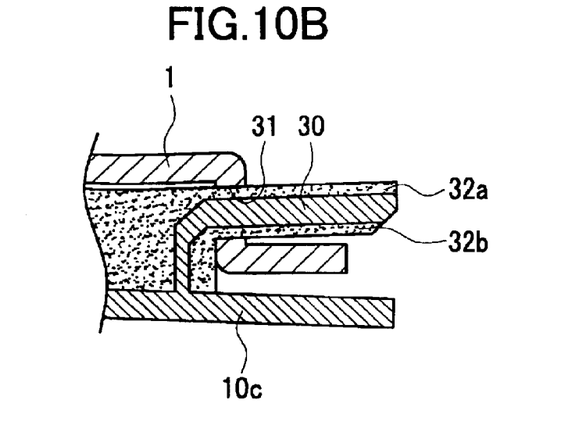
FIG. 10B is a cross section taken along line E—E of FIG. 3.
Figure 10C:
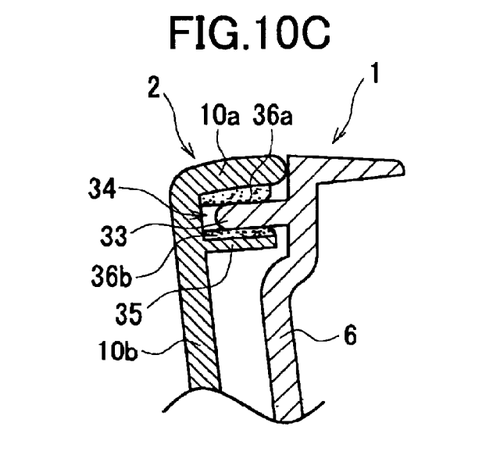
FIG. 10C is a cross section taken along line F—F of FIG. 3.

The vertical rib will be described more in detail with reference to FIGS. 10A through 10C. FIG. 10A is a cross section taken along line D—D of FIG. 3, FIG. 10B is a cross section taken along line E—E of FIG. 3, and FIG. 10C is a cross section taken along line F—F of FIG. 3. As shown in FIG. 10A, provided the second garnish 2 in a location near the rear end and the top edge thereof is a male engageable protrusion 25 that protrudes toward the first garnish 1, and provided on the first garnish 1 is a female engageable portion 26 into which the male engageable protrusion 25 is fitted. The female engageable portion 26 is in the form of a rectangular hole provided in the mount plate 6 (see also FIG. 9). Provided on the top of the male engageable protrusion 25 is a vertical rib 27 that extends in a direction perpendicular to the longitudinal direction (see also FIG. 2).

Referring now to FIGS. 2 and 8, provided at the tip of the male engageable protrusion 19 is a vertical rib 28 further projecting toward the first garnish 1, and provided in the mount plate 6 of the first garnish 1 is a rectangular hole 29 into which the vertical rib 28 may be inserted. Moreover, as shown in FIG. 2, formed on the bottom plate 10c in a location near the rear end of the second garnish 2 is a male engageable protrusion 30, and provided on the first garnish is a female engageable portion 31 into which the male engageable protrusion 30 is fitted. The female engageable portion 31 is in the form of a rectangular hole. As shown in FIG. 10B, vertical ribs 32a and 32b each extending in a direction perpendicular to the longitudinal direction are formed respectively on the top and bottom of the male engageable protrusion 30.

Although the vertical ribs 27, 28, 32a, and 32b as described above are provided on the male engageable protrusions in the present embodiment, they may be provided on the female engageable portions. As shown in FIG. 10C, provided on the mount plate 6 of the first garnish 1 in a location near the upper end thereof is a male engageable protrusion 33 that projects toward the second garnish 2, and provided on the second garnish is a female engageable portion 34 into which the male engageable protrusion 33 is fitted. The male engageable protrusion 33 is in the form of a plate extending substantially in a horizontal position. The female engageable portion 34 is comprised of the top plate 10a and a projecting plate 35 that projects in a direction substantially parallel to the top plate 10a toward the first garnish 1. The female engageable portion 34 is in the form of a groove in which the male engageable protrusion 33 may be inserted. On the underside of the top plate and on the topside of the projecting plate 35 are formed respectively vertical ribs 36a and 36b each extending in a direction perpendicular to the longitudinal direction.

With this embodiment implemented as described above, when each male engageable protrusion is fitted into the corresponding female engageable portion, the vertical rib is brought into contact with an upper or lower edge of the rectangular hole (female engageable portion) or the vertical rib is brought into contact with the male engageable protrusion from upward or downward direction. This construction restrains each male engageable protrusion from moving in a direction perpendicular to the longitudinal direction, thus allowing the second garnish 2 to be adequately positioned relative to the first garnish 1 in a direction perpendicular to the longitudinal direction, particularly in the vertical direction.

According to the above-described embodiment in which the vertical rib serves to adequately determine the relative position of both garnishes in a direction perpendicular to the longitudinal direction, the relative position of both garnishes in a direction perpendicular to the longitudinal direction can easily be adjusted by setting the dimensions of the vertical ribs as appropriate. Each vertical rib is a locally provided small piece, and thus fine adjustments in the dimensions thereof and alteration in the shape thereof are very easy. Consequently, adjustability of the relative position of both garnishes can be improved in a direction perpendicular to the longitudinal direction, particularly in the vertical direction and the direction of the width of the vehicle.

Referring now to FIGS. 1, 2, and 4 or other drawings, the first garnish 1 is provided with a first flange 6b extending in a direction substantially perpendicular to the longitudinal direction, and the second garnish 2 is provided with a second flange 10*d* extending along the first flange 6*b*. The first garnish 1 is fixed on the vehicle body 3 along the longitudinal direction at the first flange 6*b*. The second flange 10*d* is superposed on the first flange 6*b* as shown in FIG. 4, and the second garnish 2 is fixed on the first garnish 1 along the longitudinal direction at the superposed flanges.

Figure 11:
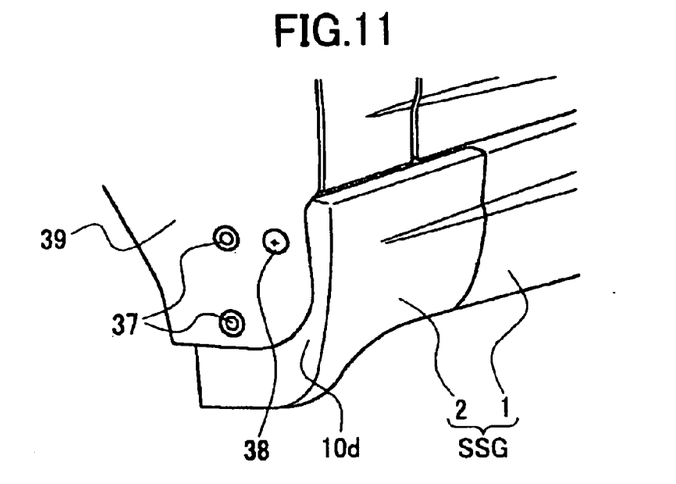
FIG. 11 is a partial external perspective view of the side sill garnish mounted on the vehicle body as viewed obliquely from a front side of the vehicle.

To be more specific, the first garnish 1 is fixed on the vehicle body 3 with the flange 6*b* thereof fastened to the vehicle body along the longitudinal direction with a pair of tapping screws 37. When the second garnish 2 is attached to the first garnish 1, the flange 10*d* is superposed outwardly on the flange 6*b* as shown in FIG. 4. With this superposed position of the flange 10*d* being kept, as shown in FIG. 2, the flanges 10*d* and 6*b* are held with a clip 38 fitted into holes 10*e* and 6*c* of the respective flanges 10*d* and 6*b*, so that the first and second garnishes 1 and 2 are fixed along the longitudinal direction. The clip 38 is in the form of a pin, and its structure is known in the art. In the present embodiment, as shown in FIGS. 4 and 11, an inner fender 39 is put on both flanges at a front side thereof, and the inner fender 39 is fixed on both flanges with the above tapping screws 37 and clip 38. The inner fender 39 is usually made of rubber, and is mounted on the vehicle body 3 in a location facing the tire housing of the front wheel.

According to the above described embodiment, each of the first and second garnishes 1 and 2 includes a flange, the first garnish 1 is mounted on the vehicle body 3 in the longitudinal direction, and the second garnish 2 is fixed on the first garnish 1 in the longitudinal direction. This construction enhances the mounting structure of the whole garnish on the vehicle body 3, and particularly serves to prevent end portions of the garnish from loosening and rattling.

Another exemplified embodiment of fastening both flanges may be implemented, for example, by superposing both flanges 6*b* and 10*d*, and integrally fixing both flanges 6*b* and 10*d* on the vehicle body 3 in the longitudinal direction with a single fixing member. To give an example, the same tapping screw 37 as described above or other fixing members may be used to combine and fix the flanges 6*b* and 10*d* on the vehicle body 3. This construction also enhances the mounting structure of the whole garnish on the vehicle body 3 and serves to prevent end portions of the garnish from loosening and rattling.

In this construction, the portion in which both garnishes are combined and fixed on the vehicle body is located in a position far from the butt-joined portion of both garnishes, and the garnishes are combined and fixed on the vehicle body in the longitudinal direction. Therefore, the advantageous effect of the previously described embodiment in which the second garnish 2 is mounted on the first garnish 1 is not spoiled. That is, the second garnish 2 moves in accordance with the expansion and contraction of the first garnish 1 in the longitudinal direction derived from heat or the like, and thereby the clearance in the butt-joined portion of the garnishes can be set at an adequately small dimension.

The preferred embodiments of the present invention have been described above. It is to be understood that the present invention is applicable to "a long plastic component comprised of a plurality of divisional constituent parts that are combined together into one long piece and mounted on a vehicle body". For example, a bumper, a front fender, a rear fender, a front spoiler, a rear spoiler, and the like are the long plastic component in which the present invention can be carried out into practice. Moreover, the long plastic component comprised of three or more of constituent parts (e.g., a side sill garnish as above of which the rear end portion is divided) is within the scope of the present invention as far as the relationship between the constituent parts is the same as that between the above first and second constituent parts. Otherwise, the layout, shape, and number of each element are not limited to those illustrated in the accompanied drawings, and various modifications and changes may be made in the present invention without departing from the spirit and scope thereof.

According to the present invention, adjustment of clearance in a butt-joined portion between the first constituent part and the second constituent part can be made with ease, and the clearance can be set at an adequately small dimension. Therefore, an outward appearance of an exterior trim mounted on the outside of a vehicle body such as a side sill garnish can be improved. Further, the small clearance allows the constituent parts to become contiguous with each other smoothly, improving the aerodynamic characteristics of a vehicle that travels, and reducing clogging with dust and the like.

What is claimed is:

1. A divided structure of a long plastic component for a vehicle, in which a plurality of constituent parts making up the long plastic component are combined together into one long piece and mounted on a vehicle body, and edge portions of exterior surfaces of the constituent parts being butt-joined with each other in a longitudinal direction of the long plastic component, the constituent parts comprising:

a first constituent part to be mounted on the vehicle body; and a second constituent part to be mounted on the first constituent part in such a manner as to overlap with the first constituent part from an outward direction of the vehicle body, substantially perpendicular to a longitudinal direction of the long plastic component, wherein the first constituent part and the second constituent part, which have been joined together, are mounted on the vehicle body, and wherein the long plastic component comprises a sill garnish.

2. A divided structure of a long plastic component for a vehicle according to claim 1, wherein one of the first constituent part and the second constituent part includes a male engageable protrusion protruding toward the other, while said other includes a female engageable portion into which the male engageable protrusion is fitted;

wherein one of the male engageable protrusion and the female engageable portion includes a longitudinal rib extending in the longitudinal direction; and wherein the first and second constituent parts are joined together by fitting the male engageable protrusion into the female engageable portion with the constituent parts each guided in an adequate relative position in the longitudinal direction by the longitudinal rib.

3. A divided structure of a long plastic component for a vehicle according to claim 1, wherein one of the first constituent part and the second constituent part includes a male engageable protrusion protruding toward the other, while the other includes a female engageable portion into which the male engageable protrusion is fitted;

wherein one of the male engageable protrusion and the female engageable portion includes a vertical rib extending in a direction substantially perpendicular to the longitudinal direction of the first constituent part; and wherein the first and second constituent parts are joined together by fitting the male engageable protrusion into the female engageable portion with the constituent parts each guided in an adequate relative position in the direction substantially perpendicular to the longitudinal direction by the vertical rib.

4. A divided structure of a long plastic component for a vehicle according to claim 1, wherein the first constituent part is mounted on the vehicle body with a first clip, and the second constituent part is mounted on the first constituent part with a second clip.

5. A divided structure of a long plastic component for a vehicle according to claim 4, wherein one of the first and second constituent parts includes a reinforcing rib for enhancing stiffness around a portion where the second clip is fastened, the reinforcing rib being located near the portion.

6. A divided structure of a long plastic component for a vehicle according to claim 1, wherein the first constituent part includes a first flange extending in a direction substantially perpendicular to the longitudinal direction, and the second constituent part includes a second flange extending along the first flange;

wherein the first constituent part is fixed on the vehicle body along the longitudinal direction proximate to the first flange; and wherein the second flange is superposed on the first flange, and the second constituent part is fixed on the first constituent part along the longitudinal direction at the superposed flanges.

* * * * *